United States Patent [19]

Nieboer et al.

[11] Patent Number: 4,700,525

[45] Date of Patent: Oct. 20, 1987

[54] MOLDED PANEL ASSEMBLY AND FASTENERS THEREFOR

[75] Inventors: Keith A. Nieboer, Holland; Herbert D. Tucker, Rochester, both of Mich.

[73] Assignee: Donnelly Corporation, Holland, Mich.

[21] Appl. No.: 852,416

[22] Filed: Apr. 16, 1986

[51] Int. Cl.⁴ .............................................. E04B 1/38
[52] U.S. Cl. ...................................... 52/698; 52/208; 52/397
[58] Field of Search ................. 52/208, 397, 400, 717, 52/698; 296/201, 84 C, 84 A, 84 R

[56] References Cited

U.S. PATENT DOCUMENTS

| | | |
|---|---|---|
| 1,614,156 | 1/1927 | Schmidt . |
| 1,763,603 | 6/1930 | Donahue . |
| 1,911,578 | 5/1933 | Masters . |
| 1,963,941 | 6/1934 | Duffy ........................................ 20/16 |
| 2,025,198 | 12/1935 | Conrow .................................. 20/56.5 |
| 2,137,472 | 11/1938 | Forbes ........................................ 18/42 |
| 2,258,724 | 10/1941 | Wagner et al. ......................... 20/40 |
| 2,266,235 | 12/1941 | Mollard ................................ 20/56.5 |
| 2,342,758 | 2/1944 | Saunders et al. ..................... 296/84 |
| 2,436,728 | 2/1948 | Parsons ................................ 296/44 |
| 2,507,965 | 5/1950 | Eichner ................................ 16/150 |
| 2,555,204 | 5/1951 | Sorrell .................................... 20/53 |
| 2,576,392 | 11/1951 | Downes ................................ 189/64 |
| 2,579,072 | 12/1951 | Harris .................................... 20/69 |
| 2,645,827 | 7/1953 | Koll .................................... 20/56.4 |
| 2,701,041 | 2/1955 | Toth .................................... 189/58 |
| 2,718,664 | 9/1955 | Schweitzer ............................ 18/30 |
| 2,733,789 | 2/1956 | Tolle .................................... 189/78 |
| 2,736,067 | 2/1956 | Boschi .................................... 18/59 |
| 2,966,435 | 12/1960 | Kassinger ........................... 154/2.71 |
| 2,974,407 | 3/1961 | Barr .................................... 29/428 |
| 3,032,808 | 5/1962 | Fleming ................................ 16/150 |
| 3,037,596 | 6/1962 | Fordyce ................................ 189/88 |
| 3,052,496 | 9/1962 | Frey .................................... 296/44 |
| 3,150,421 | 9/1964 | Lickert ................................ 20/56.4 |
| 3,155,204 | 11/1964 | Campbell et al. ..................... 189/77 |
| 3,183,285 | 5/1965 | Boylan .................................. 264/45 |
| 3,263,014 | 7/1966 | Deisenroth ........................... 264/261 |
| 3,274,740 | 9/1966 | Hall .................................... 52/208 |
| 3,314,640 | 4/1967 | Snow .................................... 249/83 |
| 3,343,867 | 9/1967 | Couch et al. ......................... 296/97 |
| 3,381,340 | 5/1968 | Chapin, Jr. ............................. 18/36 |
| 3,408,438 | 10/1968 | Staunton ............................. 264/252 |
| 3,409,174 | 11/1968 | Radcliffe et al. ...................... 222/70 |
| 3,430,333 | 3/1969 | Hodgen ............................. 29/472.9 |

(List continued on next page.)

FOREIGN PATENT DOCUMENTS 76924 4/1983 European Pat. Off. .
2102817 8/1972 Fed. Rep. of Germany .
2559181 7/1977 Fed. Rep. of Germany .

(List continued on next page.)

OTHER PUBLICATIONS

General Motors (Fisher Body Division) Drawing No. 20543735 entitled, "Clip Qtr Wdo Glass", dated May 10, 1983, and two photographs of a sample of such clip.

(List continued on next page.)

Primary Examiner—Carl D. Friedman
Attorney, Agent, or Firm—Price, Heneveld, Cooper, DeWitt & Litton

[57] ABSTRACT

A molded panel assembly such as that for a vehicle window and various embodiments of fasteners for mounting on the molded panel assembly and securing the panel assembly to a support such as a vehicle body are disclosed. The panel assembly is of the type including a panel with a peripheral edge and a casing of molded material, such as a resinous plastic, molded around at least a portion of the peripheral edge of the panel. Each of the fasteners includes a base, resilient means on the base for engaging a rigid member, such as the window panel itself, to urge the base into sealing contact with a mold portion during molding of the casing of the assembly and for retaining the fastener in the molded portion or casing of the assembly. Attachment means are also provided on the base for securing the fastener and panel assembly to a support. In certain forms, the attachment means on the fastener may include at least one resilient member extending from the base and adapted to engage a pocket in a mold assembly to retain the fastener in a desired position within a mold during molding of the casing. Projecting means are provided on the base for locating and positioning the fastener in a mold during molding of the casing and for aiding in the retention of the fastener in the casing.

59 Claims, 26 Drawing Figures

U.S. PATENT DOCUMENTS

| | | | |
|---|---|---|---|
| 3,440,121 | 4/1969 | Shockey | 156/293 |
| 3,468,738 | 9/1969 | Deisenroth | 156/293 |
| 3,523,994 | 8/1970 | Shockey | 264/252 |
| 3,580,796 | 5/1971 | Hick, Jr. et al. | 161/190 |
| 3,684,420 | 8/1972 | Barker | 425/242 |
| 3,711,893 | 1/1973 | King | 16/128 |
| 3,719,222 | 3/1973 | Harding et al. | 160/371 |
| 3,744,201 | 7/1973 | Dochnahl | 52/400 |
| 3,759,004 | 9/1973 | Kent | 52/400 |
| 3,774,363 | 11/1973 | Kent | 52/400 |
| 3,776,591 | 12/1973 | Krueger | 296/146 |
| 3,785,104 | 1/1974 | Dailen | 52/400 |
| 3,806,188 | 4/1974 | Tantlinger | 296/146 |
| 3,807,146 | 4/1974 | Witkowski | 55/357 |
| 3,843,982 | 10/1974 | Lane et al. | 9/1 |
| 3,851,432 | 12/1974 | Griffin | 52/400 |
| 3,879,241 | 4/1975 | Butler | 156/108 |
| 3,881,303 | 5/1975 | Krafka et al. | 56/192 |
| 3,884,007 | 5/1975 | Thoman | 52/624 |
| 3,900,686 | 8/1975 | Ammons et al. | 428/425 |
| 3,928,106 | 12/1975 | Molnar | 156/210 |
| 3,967,424 | 7/1976 | Gates | 52/208 |
| 3,970,732 | 7/1976 | Slaats et al. | 264/40.5 |
| 4,007,536 | 2/1977 | Soderberg | 29/421 |
| 4,059,564 | 11/1977 | Coughlan et al. | 264/46.4 |
| 4,072,340 | 2/1978 | Morgan | 296/84 |
| 4,093,304 | 6/1978 | Ziegler | 296/84 |
| 4,108,423 | 8/1978 | Skubal | 267/74 |
| 4,139,234 | 2/1979 | Morgan | 296/84 |
| 4,165,083 | 8/1979 | Dochnahl | 277/184 |
| 4,165,119 | 8/1979 | Hedeen et al. | 296/93 |
| 4,270,792 | 6/1981 | Mathieson et al. | 296/93 |
| 4,277,526 | 7/1981 | Jackson | 428/31 |
| 4,284,673 | 8/1981 | Ockels | 428/54 |
| 4,307,062 | 12/1981 | Wingard | 422/133 |
| 4,308,226 | 12/1981 | Wingard | 264/45.3 |
| 4,336,009 | 6/1982 | Wolf | 425/116 |
| 4,338,270 | 7/1982 | Uffindell | 264/46.4 |
| 4,363,191 | 12/1982 | Morgan | 49/381 |
| 4,364,214 | 12/1982 | Morgan et al. | 52/311 |
| 4,364,595 | 12/1982 | Morgan et al. | 296/84 |
| 4,379,104 | 4/1983 | Koorevaar | 264/45.5 |
| 4,379,379 | 4/1983 | Sengoku | 52/717.1 X |
| 4,387,923 | 6/1983 | Choby et al. | 296/201 |
| 4,396,221 | 8/1983 | Morgan et al. | 296/84 |
| 4,405,174 | 9/1983 | Yamane et al. | 296/201 |
| 4,434,593 | 3/1984 | Horike et al. | 52/208 |
| 4,444,705 | 4/1984 | Kumasaka et al. | 264/46.5 |
| 4,543,283 | 9/1985 | Curtze et al. | 428/38 |
| 4,561,625 | 12/1985 | Weaver | 249/85 |
| 4,584,155 | 4/1986 | Zanella | 264/252 |
| 4,591,203 | 5/1986 | Furman | 296/201 |
| 4,606,159 | 8/1986 | Kunert | 52/400 X |

FOREIGN PATENT DOCUMENTS

| | | |
|---|---|---|
| 3333672 | 4/1985 | Fed. Rep. of Germany ... 296/84 A |
| 1391524 | 12/1965 | France . |
| 54-152970 | 12/1979 | Japan . |
| 57-158481 | 3/1981 | Japan . |
| 58-36429 | 8/1981 | Japan . |
| US84/01523 | of 0000 | PCT Int'l Appl. . |
| 451507 | 8/1936 | United Kingdom . |
| 678891 | 9/1952 | United Kingdom ............ 296/84 A |
| 695257 | 8/1953 | United Kingdom . |
| 1332551 | 10/1973 | United Kingdom . |
| 1347255 | 2/1974 | United Kingdom . |
| 1361385 | 7/1974 | United Kingdom . |
| 1440389 | 6/1976 | United Kingdom . |
| 1495580 | 12/1977 | United Kingdom . |
| 1502735 | 3/1978 | United Kingdom . |
| 2065266A | 6/1981 | United Kingdom . |
| 675147 | 7/1982 | United Kingdom . |
| 2132130A | 7/1984 | United Kingdom . |
| 2141375A | 12/1984 | United Kingdom . |

OTHER PUBLICATIONS

General Motors (Fisher Body Division) Drawing No. 20489571, dated Jun., 1983, entitled, "Clip Wdo Asm Cls & Rvl Mldg Qtr".

"Use of the RIM Process for Producing Modular Window Assemblies for the Ford Motor Company", Excel Industries, Inc., Sep. 23, 1981.

Libbey-Owens-Ford Co., Toledo, Ohio-Drawing (of mold allegedly made prior to Sep. 30, 1982).

MOLDED PANEL ASSEMBLY AND FASTENERS THEREFOR

BACKGROUND OF THE INVENTION

This invention relates to panel assemblies with molded peripheral casings or gaskets and fastening means for securing such assemblies in supports. More specifically, the invention relates to a panel assembly such as a composite window assembly for vehicles including fasteners which secure the assembly as a unit in a vehicle after molding.

In recent years, window assemblies for vehicles have progressed from individually assembled units built up from separate parts on the vehicle to unitary, modular designs which are completely preassembled as a unit and can be applied as a unit from the exterior of a vehicle in a single operation. Such assemblies provide considerable savings in time and cost. In addition, savings in weight, and thus fuel consumption, for the resulting vehicle have been obtained with such assemblies because of the lighter weight resinous plastic materials which can be used to manufacture the units.

Various types of fasteners for securing such modular assemblies to vehicles or other supports have been proposed. Some have included continuous peripheral metal frames as well as individual metal fasteners separately embedded in a molded casing surrounding the peripheral edge of a window glass and projected through an opening in the vehicle body for securement with fasteners on the interior of the vehicle. Other prior known fasteners have included two parts including some type of anchoring member inserted in the molded peripheral casing of the window unit and to which an attaching or securing member is glued or otherwise affixed after molding of the window unit.

Problems have been encountered in using the prior known fasteners. In some cases, the fasteners were not securely retained in the molded casing. In other situations, the fasteners obstructed proper movement of molding material in and around the fastener preventing proper embedding. In yet other instances, the fasteners did not provide adequate attachment to the vehicle body. Greater expense was encountered with the above mentioned two piece fasteners which required the extra step of mounting the attaching structure to the anchor in the molded casing. Such two part constructions also left doubt as to the integrity of the joint between the attaching member and anchor.

A related problem was encountered in positioning and locating fasteners in mold assemblies during molding of the window units. Locating the fasteners to extend from the precise position in the window unit for proper registry with openings in the vehicle body is critical. Many difficulties were found in holding the fasteners in position within a mold cavity after the mold sections were closed and during injection of the molding material. The pressure of the injected material tended to move the fasteners from their preset locations. In some cases, movement of the molding material was obstructed such that the fasteners were not properly embedded in the molded casing allowing them to loosen or pull free from the window unit. This resulted in leakage around the window assembly on the vehicle, removal of the window unit by vandals, or other failure in the attachment of the window to the vehicle. Also, keeping the overall size and complexity of a mold assembly to a minimum while providing for proper positioning and location of fasteners for embedding within the molded casings of the windows was also desired.

The present invention was designed to satisfy the above problems and to provide a strong, secure, properly positionable fastener and resulting panel assemblies including such fasteners for vehicles or other products where molded panel assemblies are needed.

SUMMARY OF THE INVENTION

Accordingly, the present invention provides a panel assembly such as a molded composite window unit for vehicles adapted to be secured as a unit to a support such as a vehicle body. Each panel assembly includes a panel having a peripheral edge and a casing of molded material such as polyvinyl chloride or reaction injected molded polyurethane extending around at least a portion of the peripheral edge of the panel. The assembly also includes fasteners which are securely retained for mounting the assembly to a support, allow proper movement of molding material around the fasteners during molding, and enable proper positioning and retention of the fasteners in the mold cavity during molding of the panel assemblies.

In one form, the invention provides a fastener for securing a panel assembly such as a vehicle window assembly or the like to a support, the fastener adapted for embedding in a molded portion of the panel assembly. The fastener includes a base, resilient means on the base for engaging a rigid member in the panel assembly to urge the base into sealing contact with a mold portion during formation of the molded portion of the assembly and for retaining the fastener in that molded portion. Attachment means on the base are also provided for securing the fastener and panel assembly to a support.

Preferably, the fastener is molded in one piece from a polymeric material such as acetal resin and includes retaining means on the base separate from the resilient means for aiding the retention of the fastener in the molded portion of the assembly and projecting means extending from the base for aiding the location and positioning of the fastener in a mold section during molding and for aiding in the retention of the fastener in the molded portion after manufacture. The resilient and retaining means may include various shapes of curved or other flanges which may be tapered for flexing. Alternately, a tubular member extends generally parallel to the base and includes flexible sidewalls which provide resiliency.

The resilient means are pressed against a rigid member, such as the panel or window glass itself, in the molded casing when the mold sections are closed during manufacture. Such pressure forces the base against a surface of the mold to prevent molding material from covering the attaching means. The result is a fastener which is securely embedded in the molded casing and having attaching means which extend out of the molded casing for attachment to the vehicle or other support.

In other aspects of the invention, various types of attaching means may be included on the fastener such as a resilient securing member, an upstanding post, an aperture for receiving a fastening member, or means for hingedly securing the fastener and panel assembly to a support. The resilient member is received in a pocket in mold to hold the fastener in proper position during molding.

The present invention therefore provides significant advantages over prior known fasteners for use in panel assemblies and over prior known panel assemblies themselves. First, the fasteners provide for proper embedding and secure retention in molded casing portions of panel assemblies such as vehicle windows. The resilient means and retaining means on the base of the fasteners allow proper movement of the molding material therearound for such embedding. In addition, the one piece fasteners allow secure attachment of the fastener and panel assembly without the need for separate attachment of securing structures by adhesives or the like. The fasteners also allow proper engagement with the mold assemblies as biased by the resilient means to prevent flow of molding material around the attaching means. In addition, the attaching means and resilient means of the fasteners allow proper positioning, location and retention of the fasteners in the mold cavity during injection of molding material and allow proper flow of the molding material. Molds may be easily adapted to receive the fasteners of the present invention with minimal preparation or modification while the fasteners themselves remain precisely positioned and include structure to prevent shifting or movement in position within the mold cavities during injection of the mold material therearound.

These and other objects, advantages, purposes and features of the invention will become more apparent from a study of the following description taken in conjunction with the drawings.

DESCRIPTION OF THE PREFERRED EMBODIMENTS

Figure 1:
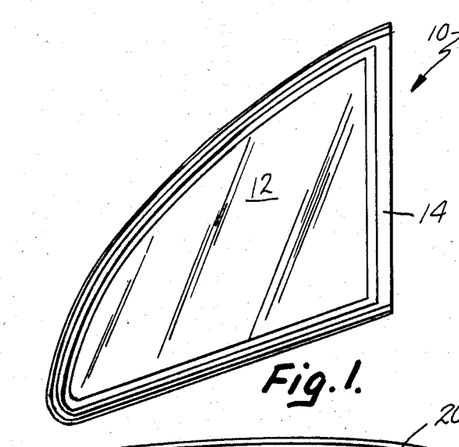
FIG. 1 a perspective view of the exterior side of a panel assembly of the present invention incorporating the fasteners of the present invention, the panel assembly being of the type forming a window unit for vehicles.
Figures 2, 4:
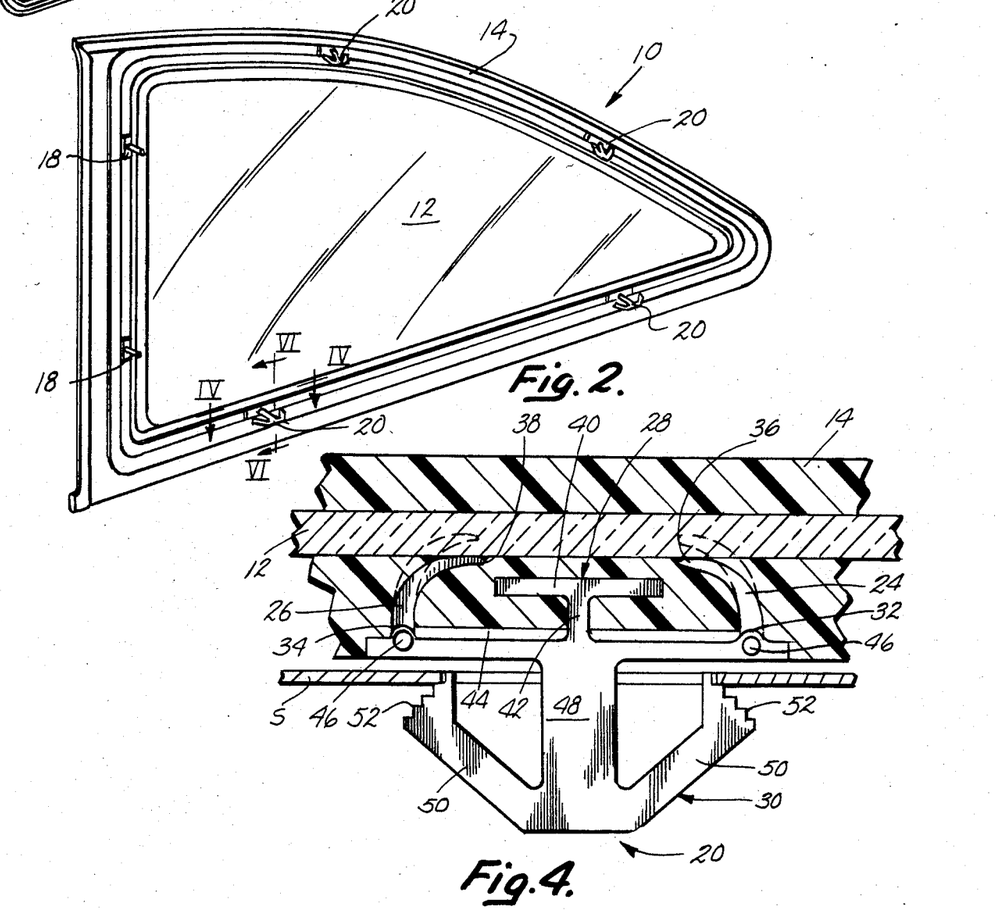
FIG. 2 a perspective view of the interior side of the panel assembly of FIG. 1.
FIG. 4 a sectional view of the panel assembly of FIGS. 1 and 2 showing one of the fasteners and taken along line IV—IV of FIG. 2.
Figures 5, 6, 7, 8, 9:
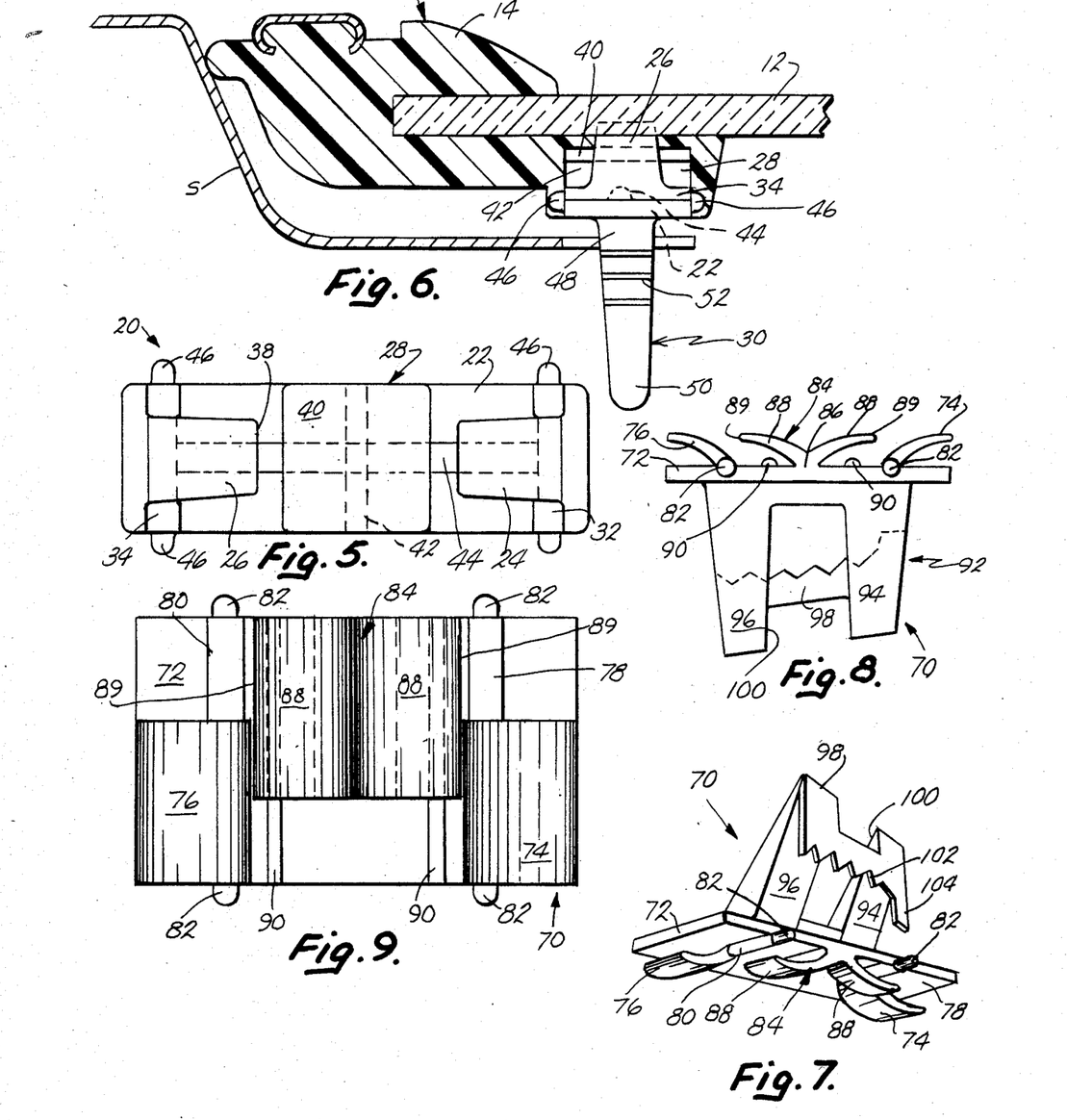
FIG. 5 is a bottom plan view of the fastener of FIG. 3.
FIG. 6 is a side sectional view of the panel assembly of FIGS. 1 and 2 showing one of the fasteners taken at a right angle to the view of FIG. 4 along line VI—VI of FIG. 2.
FIG. 7 is a perspective view of a second embodiment of the fastener of the present invention.
FIG. 8 is a side elevation of the fastener of FIG. 7.
FIG. 9 is a bottom plan view of the fastener of FIGS. 7 and 8.
Figures 10, 11, 12, 13, 14, 15:
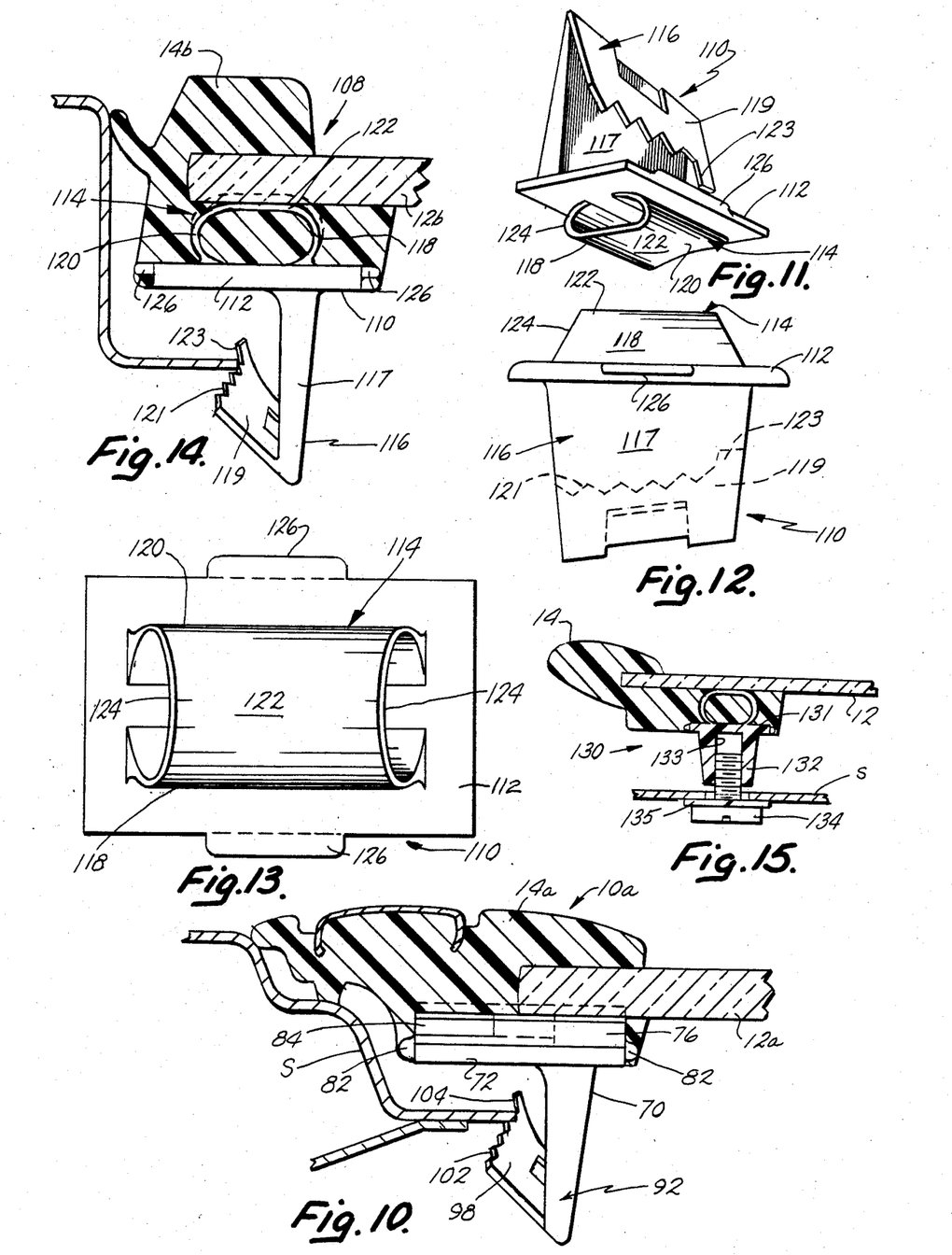
FIG. 10 is a sectional view of a panel assembly incorporating the fastener of FIGS. 7-9 showing the fastener from the end.
FIG. 11 is a perspective view of a third embodiment of the fastener of the present invention.
FIG. 12 is a side elevation of the fastener of FIG. 11.
FIG. 13 a bottom plan view of the fastener of FIGS. 11 and 12.
FIG. 14 is a sectional view of a panel assembly incorporating the fastener of FIGS. 11-13 showing the fastener from the end.
FIG. 15 is a sectional view of a panel assembly incorporating a modification of the third embodiment of the fastener of the present invention.

Referring now to the drawings in greater detail, FIGS. 1 and 2 illustrate one form of the panel assembly 10 of the present invention incorporating a first embodiment 20 of the fastener of the present invention. Panel assembly 10 is a modular window unit adapted for use in a vehicle and includes a transparent panel 12 of sheet glass which may be planar or curved. A molded peripheral gasket or casing 14 extends around the entire peripheral edge of panel 12. The specific window assembly 10 shown in FIGS. 1 and 2 is adapted for use as a rear quarter window of a vehicle and is completely premanufactured prior to installation on a vehicle. It is assembled in one piece as a unit from the exterior of the vehicle over an opening in the body sheet metal of the vehicle. In this case, molded casing 14, which may be formed either from polyvinyl chloride or reaction injected molded polyurethane, includes various ribs extending along the front and rear surfaces. Such ribs are adapted to conform the casing to the shape of the body sheet metal to seal the assembly against the vehicle body to prevent entry of water, dirt and other contaminants between the window and the body. Molded casing 14 is resilient and somewhat flexible and may be pressed against the body sheet metal to form an effective seal as shown in FIGS. 6, 10 and 14 and also allows embedding and incorporation of fasteners 20 during molding as described below. The glass used in assembly 10 is preferably laminated or tempered safety glass and may be tinted or clear as desired. Of course, the shape of the panel or glass sheet may be cut as desired with the peripheral molded casing 14 formed to such shape and extending along at least portions of the peripheral edge although extension of the casing around the entire periphery is not necessarily required in all instances.

Window assembly 10 is designed for permanent installation to provide a window which cannot be raised or lowered. Of course, other forms of the invention may be hinged to the vehicle body for opening or may be incorporated in other structures to allow raising and lowering. As mentioned above, the assembly provides an improvement over the prior known piecemeal assembly methods used for installation of permanently positioned or other windows in vehicles and other structures and allows installation of the window assembly as a unit from the exterior of the automobile or other vehicle with only final securement of a few nuts or other securing means being necessary from the interior to complete the installation.

Fasteners 20 are spaced along the inside surface of the molded gasket 14 such that they will be in registry with openings in the vehicle body sheet metal to allow insertion of the window unit completely from the exterior. As described below, fasteners 20 resiliently engage the openings in the sheet metal, are compressed to move through such openings and thereafter expand to engage an edge of the openings to retain the assembly securely in place over the vehicle body opening. Fasteners 20 may be incorporated into the molded casing 14 along with other types of fasteners such as conventionally known headed studs 18 which may be secured directly to the window glass 12 or embedded in the molded casing using conventionally known methods not forming a part of the present invention.

Referring now to FIGS. 3–6, fastener 20 includes a rectangular, planar base 22. Resilient, flexible flanges 24, 26 extend outwardly from one side of the base at spaced positions adjacent either end with a T-shaped retaining member 28 also extending from base 22 intermediate flanges 24, 26. Attaching member 30 extends outwardly from the opposite side of base 22. The entire fastener 20 is preferably molded in one piece from a resilient, flexible polymeric material such as acetal resin which has excellent memory and resiliency characteristics, is not water absorbent, and meets the requirements for vehicle manufacturers with respect to resisting environmental conditions such as corrosion and the like.

Resilient, flexible flanges 24, 26 curve toward one another from rounded ribs 32, 34 which extend laterally across the base 22. Flanges 24, 26 narrow toward their free ends 36, 38 such that the flanges can flex under pressure within a mold from the position shown in dotted lines to the position shown in solid in FIG. 4. When placed within a mold assembly during manufacture of a window assembly 10, flanges 24, 26 engage a rigid member within the casing such as glass panel 12 to bias and force base 22 outwardly away from glass sheet 12 and against a portion of the mold assembly. This forms a seal between the base and the mold assembly to prevent mold material from flowing in and around attaching member 30. Such sealing contact prevents attaching member 30 from being embedded within the molding material and allows it to extend out of the molded casing for securing purposes. As shown in FIGS. 5 and 6, resilient flanges 24, 26 have a width substantially less than the width of both base 22 and T-shaped retaining member 28. Such lesser width reduces pressure of the molding material against the fastener which would tend to move the fastener from its proper position in the mold during manufacturing. Such width also aids the flow of mold material along the length of the fastener to allow proper embedding in the molding material for secure retention of the fastener.

As shown in FIGS. 4–6, T-shaped retaining member 28 includes a substantially square, planar retaining flange 40 extending at right angles to a support flange 42 which joins flange 40 to base 22 at the center of the base. Flanges 40, 42 extend the full lateral width of base 22 to provide a maximum retention area. The ends of flange 40 extend outwardly from flange 42 substantially parallel to base 22 but are spaced from the base by the length of flange 42. This provides an area for filling with mold material while the parallel extension provides maximum retaining strength when embedded in the molding material. Base 22 is further reinforced by a longitudinally extending rib 44 which extends between the insides of flanges 24, 26 and the inside surfaces of flange 42 as shown in FIGS. 4–6. The overall height of retaining member 28 is less than the height of flanges 24, 26, either in their free state or when compressed by the mold assembly as shown in FIGS. 4 and 6. Hence, retaining member 28 does not engage or touch glass 12 but is merely firmly embedded within the molding material to help retain the fastener in place in assembly 10.

Figure 3:
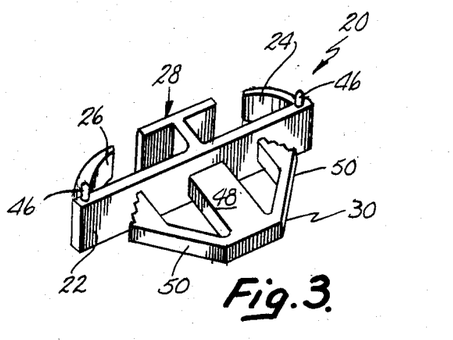
FIG. 3 is a perspective view of a first embodiment of the fastener of present invention.

Location and positioning of base 22 and the entire fastener 20 in a mold and retention of the fastener within the molding material are aided by extending pins 46 which project outwardly from the lateral side edges of base 22 at four spaced positions aligned with the ribs 32, 34 as shown in FIGS. 3–6. Cylindrical pins 46 are spaced below the top surface of base 22 from which attaching member 30 extends. This allows molding material to flow around the pins and enclose and embed them as shown in FIG. 6 to aid the retention of the fastener within the molded casing 14. As shown in FIGS. 3, 5 and 6, the ends of pins 46 are rounded and are adapted to be engaged by surfaces of the mold assembly to properly and precisely locate and position the fastener and base 22 during molding.

Attaching member 30 includes an upstanding post or support 48 and a pair of flexible, resilient attaching arms 50 extending from opposite sides of post 48 generally along the longitudinal centerline of base 22. Arms 50 thus extend longitudinally of base 22 and downwardly toward the base but outwardly away from post 48. Post 48 is generally rectangular in section although it tapers toward its outer end from the area at which it contacts base 22 as is shown in FIG. 6. Arms 50 taper slightly outwardly from their areas of connection to post 48 and terminate in a series of serrations 52 extending across the free end of each arm as is best seen in FIG. 4. Serrations 52 engage the edges of an aperture or recess formed in the vehicle body sheet metal S of a vehicle when the window assembly 10 is installed. Serrations 52 prevent withdrawal of the window unit from the vehicle body unless arms 50 are purposely flexed or compressed toward post 48 such that they will fit through the opening in the sheet metal S. However, when window assembly 10 is inserted through such openings, the angled extension of arms 50 toward the window assembly automatically cams and flexes the arms inwardly toward post 48 and base 22 as the window assembly is forced toward body sheet metal S. After passing through the sheet metal opening, the natural resiliency of the fastener 20 causes arms 50 to snap back outwardly to their free state position. This allows serrations 52 to engage the edge of the aperture in the sheet metal to retain the unit in place. The unit is thus held with molded casing 14 in tight engagement with the contoured sheet metal S.

Figures 24, 25, 26:
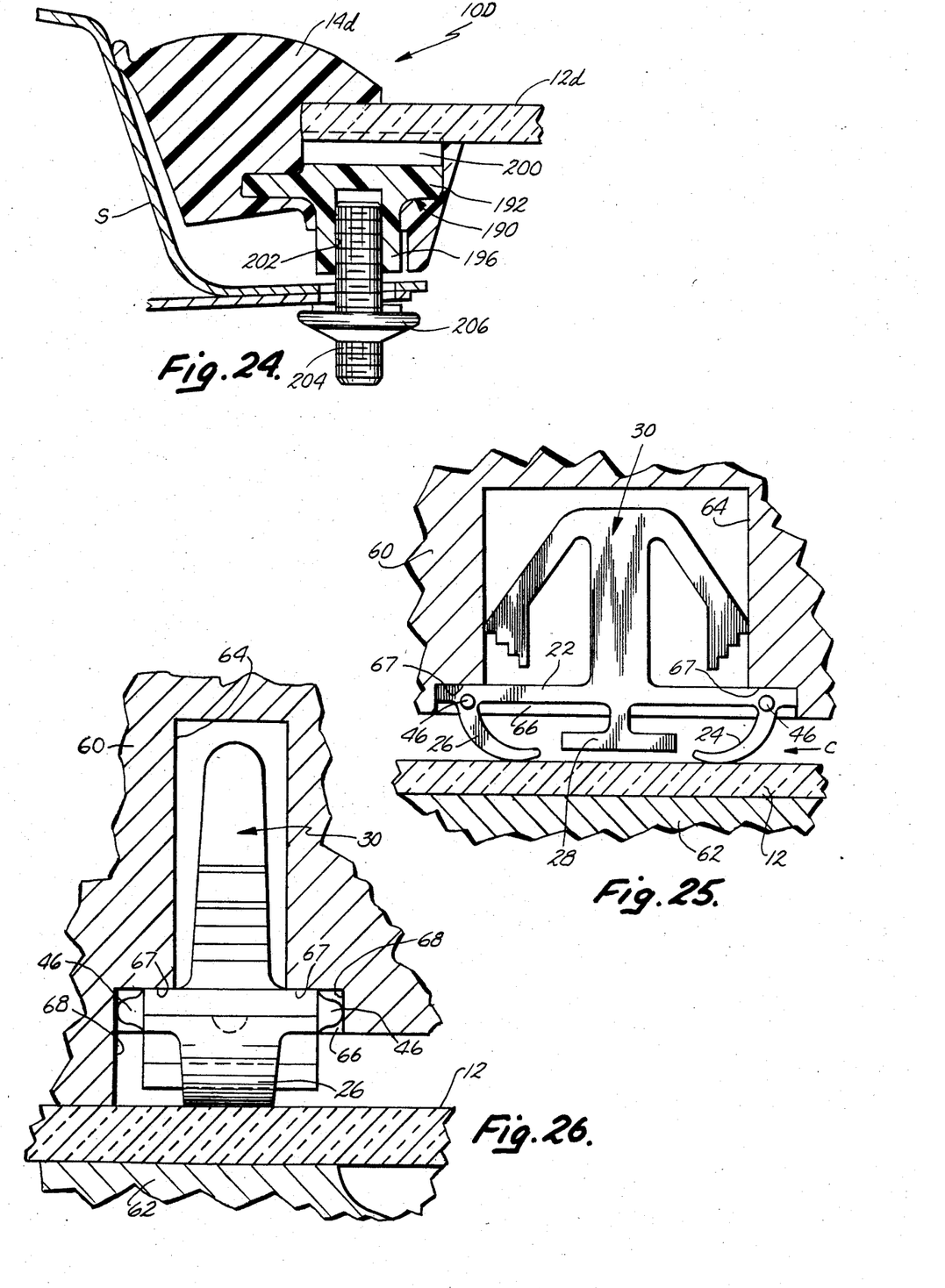
FIG. 24 a sectional view of a panel assembly incorporating the fastener of FIGS. 22 and 23 showing the fastener in section.
FIG. 25 is an enlarged sectional view of a mold assembly showing the positioning of the first embodiment of the fastener immediately prior to injection of molding material into the cavity.
FIG. 26 a sectional view of the mold assembly of FIG. 25 taken at a right angle to FIG. 25.

Referring now to FIGS. 25 and 26, fastener 20 is prepositioned in a mold assembly prior to closing that assembly for the formation of the molded casing 14 around glass 12. A typical mold assembly includes a pair of mold sections 60, 62 with a pocket or slot for receiving fastener 20 prior to closing of the molds. The pocket or slot includes recess or pocket 64 which is slightly wider than the width of attaching member 30 and is slightly deeper than the overall height of member 30. A wider and longer but shallower stepped portion 66 of the pocket or slot for receiving fastener 20 communicates with pocket 64 to receive base 22 and locating, positioning pins 46. The surface of base 22 from which attaching member 30 extends contacts bottom surface 67 of pocket portion 66 while pins 46 engage the sides 68 of that pocket portion. The flexible, resilient arms 50 are slightly compressed by the length of pocket portion 64 which is slightly less than the overall dimension of the attaching member 30 measured across arms 50 at their widest point in their free state. The resiliency of arms 50 holds fastener within the pocket while base 22 is securely and properly positioned by locating and positioning pins 46 as described above.

After fasteners 20 are positioned within one mold section, the mold sections are closed to form mold cavity C with the opposite mold section 62 pressing glass 12 against resilient, flexible flanges 24, 26. Such pressure when the mold sections are closed forces base 22 tightly into sealing contact with surfaces 67 of mold pocket 66. As the mold sections are completely closed, flanges 24, 26 are compressed since the overall depth of cavity C including glass 12 is less than the combined thickness of base 22, flanges 24, 26 and glass 12 when in contact with one another. However, if the depth of pocket 64 is too small, the height of attaching member 30 will prevent base 22 from sealingly engaging surface 67 or cause overcompression and failure of flanges 24, 26. The compression of flanges 24, 26 flexes them inwardly toward one another and retaining member 28 as shown in FIGS. 4, 6 and 25. The natural resiliency of fastener 20 biases and urges base 22 tightly against surfaces 67 of pocket 66 to prevent molding material injected into cavity C from flowing around the base into pocket 64 which would otherwise embed and envelope attaching member 30. Preferably, the biasing force against surface 67 is about 25-30 pounds. Such force depends on the material shape and size of flanges 24, 26. Too little pressure from incorrectly sized flanges will allow leakage of mold material around base 22. Too great a pressure could prevent mold closure, or break glass 12 or the fastener itself. Hence, with proper pressure, the embedding of attaching member 30 is prevented such that it extends out of the molded casing 14 after manufacture. The pressure of the molding material flowing into cavity C also helps force base 22 tightly against surfaces 67. The molding material embeds pins 46, flanges 24, 26 and retaining member 28 to securely retain the fastener in the window assembly while leaving the top of base 22 flush with and exposed at the exterior surface of the mold material.

Of course, fastener 20 may press against another rigid member within the assembly when the mold is closed other than glass 12 to press base 22 tightly against a mold surface. Other rigid members may include sheet metal parts or other members.

Referring now to FIGS. 7-10, a second embodiment 70 of the fastener is illustrated. Fastener 70 is also designed to be incorporated by molding into a window unit or other panel assembly 10a as shown in FIG. 10 such that it extends from molded casing 14a for attachment purposes. Fastener 70 includes a different combination of resilient flanges and a retaining member as well as a different type of attaching member.

As is best seen in FIGS. 7-9, fastener 70 is preferably molded in one piece from acetal resin and includes a base 72 which is planar and rectangular. Resilient, flexible flanges 74, 76 curve outwardly away from the base toward the ends of the base opposite to the direction of curvature of flanges 24, 26 in fastener 20 and become thinner or narrow toward their free ends to allow them to flex under pressure. As in fastener 20, flanges 74, 76 extend from protruding ribs 78, 80 extending laterally across the bottom surface of base 72. Locating and positioning pins 82 are reduced diameter extensions of ribs 78, 80 at the lateral edges of base 72.

At the center of base 72, intermediate flanges 74, 76, is a gull-wing shaped retaining member 84 joined to the bottom surface of base 72 at 86 and having outwardly curved retaining flanges 88 extending therefrom. Flanges 88 become thinner or narrow toward their free ends 89 to allow those flanges to flex like flanges 74, 76 and include portions at the ends thereof which are generally parallel to the extent of base 72 but are spaced from the base to allow proper embedding and retention in the molded casing of a window unit. Strengthening ribs 90 extend laterally across the base 72 beneath flanges 88 as shown in FIGS. 8 and 9.

On the opposite side of base 72 from flanges 74, 76 and retaining member 84, is an upstanding attaching member 92 including a generally U-shaped flange having outwardly extending flange portions 94, 96 tapering to free ends at which a resilient, flexible securing flange 98 is joined as shown in FIGS. 7, 8 and 10. Flange portions 94, 96 taper to a thinner section at their outer ends while flange 98 has a uniform, thin thickness. An opening 100 extends between flange portions 94, 96 and into a portion of flange 98 as shown in FIGS. 7 and 8. The lower free end edge of flange 98 includes a series of serrations 102 adapted to engage and secure the flange to the edge of the body sheet metal S of a vehicle as shown in FIG. 10. One side of the flange 98 includes an elongated serration or tab 104 which engages the end surface of the sheet metal as shown in FIG. 10. Engagement of the sheet metal edge may be by any of the serrations of flange 98. Tab 104 is sufficiently long such that it will engage the end surface of sheet metal S but will not move past the sheet metal edge. Thus, the fastener flange 98 is not positioned completely on one side of the sheet metal. This prevents the flange from being bent backwards should assembly 70 be pulled outwardly and maintains greater holding strength for the fastener.

As will be understood from FIG. 9, retaining member 84 is offset from the centerline of base 72 such that one edge is aligned with one lateral edge of the base. Resilient flanges 74, 76 are offset in the opposite direction toward the opposite lateral edge of base 72 such that their edges are in alignment with the opposite edge of the base. Flanges 74, 76 thus are aligned with glass 12a when positioned in a window unit (FIG. 10). Such offsetting also facilitates flow of the molding material along the base from end to end and facilitates embedding of these members within the molding material for secure retention in the window unit.

Molding of the fastener 70 into a window unit 10a in FIG. 10 is accomplished substantially in the same way as for fastener 20 using mold sections with a fastener receiving pocket of stepped configuration of similar configuration. Flanges 74, 76 are adapted to be compressed against glass pane 12a or other rigid member to urge the top surface of base 72 against surfaces of the mold section to prevent flow of molding material around attaching member 92 as described above in connection with fastener 20 in FIGS. 25 and 26. The overall height of gull-winged retaining member 84 is the same as the free or compressed heights of flanges 74, 76 to assure contact with glass 12a by all those members when the mold sections are closed. Flange 98 is sufficiently flexible to flex inwardly toward flange portions 94, 96 to allow attaching member 92 to be pressed into a mold pocket such as that at 64 in FIGS. 25 and 26 to hold the fastener in the mold cavity. In the completed assembly, serrations 102 of flange 98 can move past the edge of the body sheet metal S. One portion of flange 98 expands to its normal, free state with tab 104 engaging the edge of the body sheet metal and serrations 102 engaging the back surface of the sheet metal. Flange 98 is thus slightly flexed while retaining the fastener and the panel assembly securely in place as shown in FIG. 10.

Similarly, pins 82 locate and position base 72 in a stepped pocket portion of the mold assembly such as that at 66 in FIGS. 25 and 26 to prevent movement of the fastener during injection of the molding material into the mold cavity. Pins 82 also aid retention of the fastener in the molded casing 14a after manufacture since they are spaced below the top surface of base 72 from which attaching member 92 extends and are enclosed in the casing.

As shown in FIGS. 11–14, a third embodiment 110 of the fastener is illustrated. Fastener 110 is preferably molded in one piece from acetal resin and includes a rectangular, planar base 112 with a resilient, flexible tubular retaining member 114 formed on one side of the base. An upstanding attaching member 116 extends from the opposite side of the base. Tubular member 114 combines the functions of the resilient flanges in fasteners 20 and 70 with the function of the retaining members 28, 84 in those fasteners. Thus, resilient member 114 not only flexes to force base 112 against a mold section pocket to prevent flow of molding material around attaching member 116, but also retains the fastener 110 embedded within the molded casing portion 14b of a modular window unit 10b as shown in FIG. 14 and described below.

Tubular member 114 is oval in section, has an axis generally parallel to the base, and includes sidewalls 118, 120 and a bottom wall 122. The largest dimension of the tube is generally parallel to the base. Sidewalls 118, 120 are thinner in section than the thickness of bottom wall 122 to facilitate flexing of the tubular member into a flatter, more oval shape than its normal free state when engaged by the mold sections and pressed against glass sheet 12b during molding of a window assembly (see FIG. 14). The end surfaces 124 of tubular member 114 are slanted inwardly toward one another to facilitate flow of molding material through the tubular member and around its ends.

Base 112 of fastener 110 also includes laterally extending locating and positioning lugs 126 which extend about one-third of the distance along opposing side edges of the base. Elongated lugs 126 perform the same function of positioning the base 112 in a mold assembly pocket during manufacturing as do pins 46 in FIG. 26 but are enveloped and embedded within the molding material after manufacture as shown in FIG. 14 to help retain the fastener in place in the assembly.

Attaching member 116 is substantially similar to attaching member 92 in embodiment 70 of the fastener except that it does not include a deep opening 100 in the upstanding support flange 117 thereof as in embodiment 70. It does include a thin, flexible securing flange 119 with serrations 121 and tab 123, however, similar in function to flange 98 with serrations 102 and tab 104 in embodiment 70. Accordingly, when positioned within a mold cavity as described in connection with FIGS. 25 and 26, fastener 110 is embedded in the same manner with tubular member 114 compressed by the mold sections against glass 12b or another rigid member in the assembly to urge base 112 against a portion of the fastener receiving pocket in one mold section. This prevents flow of molding material around attaching member 116 such that it will extend from the inside surface of the molded casing 14b as shown in FIG. 14 for engagement with the vehicle body sheet metal S to retain the fastener and window assembly in place on the vehicle. The top surface of base 112 is again flush with the surface of molded casing 14b with lugs 126 and tubular member 114 firmly surrounded and embedded within the mold material with tubular member 114 in its compressed state after molding.

Referring now to FIGS. 15–21, several modified versions of the fastener embodiment 110 are illustrated which incorporate different varieties of attaching members used to secure the fastener and panel assembly to a vehicle body after manufacture. In each of the fasteners shown in FIGS. 15–21, the base, resilient tubular member and side lugs extending from the lateral edges of the base are the same as those shown in embodiment 110 of FIGS. 11–14. The difference in the various embodiments is in the attaching members which extend from the side of the base opposite the tubular member embedded in the casing 14. Each of the fasteners in FIGS. 15–21 which is embedded within a casing 14 of the various window units shown therein may be molded from resinous material such as the acetal resin.

In FIG. 15, embodiment 130 of the fastener includes a truncated conical fastener receiving socket member 132 molded to extend outwardly from the base 131. Socket member 132 has a cylindrical bore 133 for receiving a retaining screw 134 inserted therein from the inside of the vehicle through an opening in sheet metal S when the window unit is placed over the opening in the vehicle body. A locking washer 135 may be included between the head of the fastener 134 and the sheet metal for secure retention.

Figure 16:
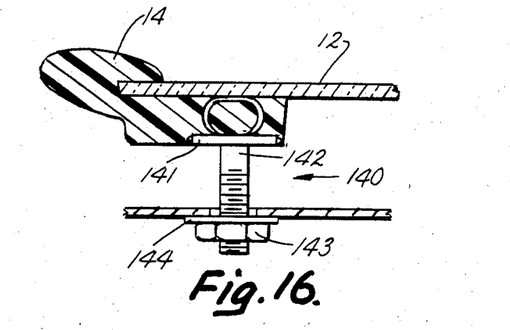
FIG. 16 a sectional view of a panel assembly incorporating a second modification of the third embodiment of the fastener of the present invention.

In FIG. 16, embodiment 140 of the fastener includes a cylindrical, threaded post or stud 142 molded integrally with and extending outwardly from base 141 through an opening in vehicle sheet metal S for receipt of a nut or other fastener 143 and washer 144 to retain the assembly in place.

Figure 17:
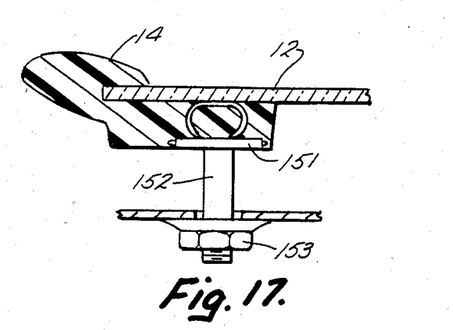
FIG. 17 is a sectional view of a panel assembly incorporating a third modification of the third embodiment of the fastener of the present invention.

In FIG. 17, embodiment 150 of the fastener includes a cylindrical, smooth sided post or stud 152 extending outwardly from base 151 through an opening in vehicle body sheet metal S for receipt of a self-threading nut 153 or other like fastener which is secured over the cylindrical post.

Figure 18:
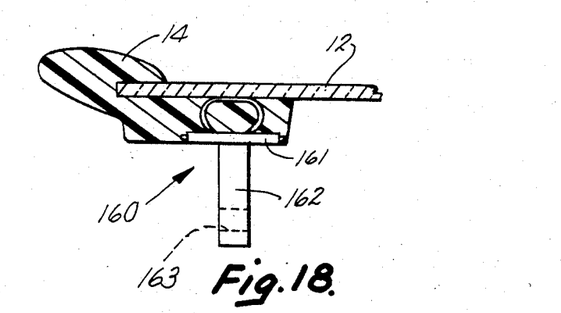
FIG. 18 is a sectional view of a panel assembly incorporating a fourth modification of the third embodiment of the fastener of the present invention.
Figure 19:
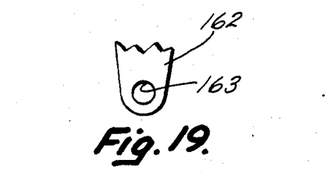
FIG. 19 a broken side view of a portion of the fastener in FIG. 18.

With reference to FIGS. 18 and 19, embodiment 160 of the fastener includes a hinge member for hingedly securing the fastener and window assembly to another member in a vehicle. Thus, a hinge flange 162 extends outwardly from base 161 and includes an aperture 163 extending therethrough for receipt of a hinge pin or the like for pivotal securement of the fastener and window assembly to another support member.

Figure 20:
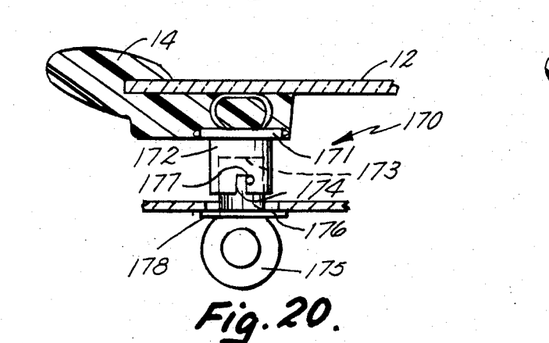
FIG. 20 is a sectional view of a panel assembly incorporating a fifth modification of the third embodiment of the fastener of the present invention.

In FIG. 20, embodiment 170 of the fastener includes a cylindrical socket member 172 extending outwardly from base 171 and including a bore 173 having a pair of oppositely located J-shaped securing slots 174 extending from the outer edges of the socket. Bore 173 receives the cylindrical sleeve 176 of an eye fastener 175. Sleeve 176 includes cylindrical lugs 177 at diametrically opposed positions for receipt in J slots 174 to hold the eye member in bore 173. Eye fastener 175 is received through a washer 178 and an opening in sheet metal S to secure the fastener and window unit in place.

Figure 21:
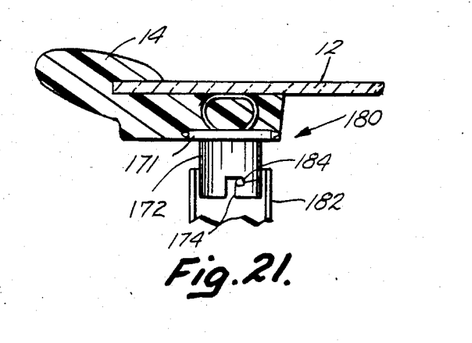
FIG. 21 is a sectional view of a panel assembly incorporating a sixth modification of the third embodiment of the fastener of the present invention.

In FIG. 21, the portion of the fastener combination 180 illustrated therein which is embedded within casing 14 of the window unit is identical to that in embodiment 170 and includes a cylindrical socket member 172 extending from base 171 and having J-shaped slots 174 therein. In embodiment 180, however, a larger diameter tubular sleeve 182 having internal cylindrical lugs 184 extending from diametrically opposed positions therein is received over socket 172 with lugs 184 fitted in J slots 174 to hold of the two parts together.

Figure 22:
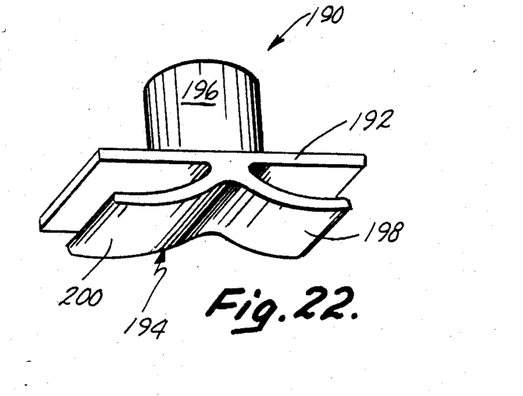
FIG. 22 is a perspective view of a fourth embodiment of the fastener of the present invention.
Figure 23:
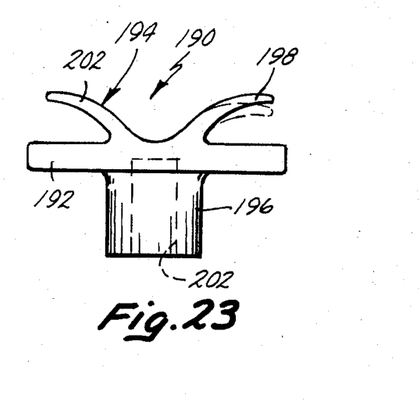
FIG. 23 is a side elevation of the fastener of FIG. 22.

A further embodiment 190 of the present invention is shown in FIGS. 22–24 and includes a rectangular, substantially planar base 192 with a combined resilient, retaining member of a gull-wing shape extending from one side of the base. A cylindrical securing or attachment socket 196 extends from the opposite side of the base. Resilient retaining member 194 includes a pair of curved, resilient, flexible flanges 198, 200 curving upwardly and outwardly away from one another from base 192 such that the outer ends are substantially parallel to base 192 but spaced therefrom as shown in FIG. 23. Flanges 198, 200 taper toward their free ends for flexibility as shown in FIG. 23. Cylindrical socket 196 extending from the opposite side of the base includes a cylindrical bore 202 extending therethrough and partially through base 192.

With reference to FIG. 24, resilient retaining flanges 198, 200 are offset toward one lateral edge of base 192 for alignment with glass sheet 12d against which those flanges are pressed when the mold sections are closed as described above. When embedded within molded casing 14d after manufacture, a portion of base 192 extends laterally into casing 14d beyond the edge of glass 12d while socket 196 extends out of the casing toward the body sheet metal of a supporting vehicle. Before installation in a vehicle, a threaded post 204 or other securing member may be inserted into bore 202 such that the post will extend through an opening in the sheet metal for receipt of a nut 206 or other fastener to hold the window unit against the vehicle body. Since socket 196 is not resilient or flexible and therefore cannot hold the fastener in a pocket or slot as with the other fasteners described above, other known means for holding the fastener in the mold assembly or for adhering it lightly in a proper position may be used with fastener 190.

Accordingly, the present invention provides numerous embodiments of a fastener uniquely designed to allow proper positioning and location within a mold assembly during manufacture of a molded window assembly and secure retention in the molded portions of such an assembly after manufacture. The resilient means incorporated in the fastener prevent flow of mold material around the attachment members which extend from the completed molded casings and which would otherwise be embedded and totally enclosed in molding material using prior known fasteners.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A fastener for securing a panel assembly such as a vehicle window assembly or the like to a support, said fastener adapted for embedding in a molded portion of the panel assembly and comprising:
   a base having opposite sides;
   resilient means on one side of said base for engaging a rigid member in the panel assembly to urge said base into sealing contact with a mold portion during formation of the molded portion of the panel assembly and for retaining said fastener in the molded portion of the panel assembly;
   attachment means on the opposite side of said base for securing the fastener and the panel assembly to a support;
   said base also having portions extending outwardly beyond and around said attachment means, said extending base portions including a surface adjacent said attachment means which is adapted to sealingly engage a mold portion during formation of the panel assembly to prevent the flow of molding material around said attachment means.

2. The fastener of claim 1 including retaining means on said base and separate from said resilient means for aiding retention of said fastener in the molded portion of said assembly.

3. The fastener of claim 2 including projecting means extending from said base for locating and positioning said fastener in a mold when forming the panel assembly and for aiding the retention of said fastener in the molded portion of the assembly.

4. The fastener of claim 2 wherein said retaining means include a flange extending outwardly from said base, said flange having at least one portion extending parallel to but spaced from said base.

5. The fastener of claim 4 wherein said resilient means include a pair of flanges spaced apart on and extending outwardly from said base; said retaining means extending from said base at a position intermediate said flanges.

6. The fastener of claim 5 wherein said base includes opposite lateral edges; said retaining means being offset toward one of said lateral edges of said base from the centerline of said base and said pair of flanges being offset toward the other of said lateral edges of said base from said base centerline whereby flow of molding material along the length of said base past said flanges and retaining means during molding of the panel assembly is promoted.

7. The fastener of claim 4 wherein said retaining means are T-shaped.

8. The fastener of claim 4 wherein said retaining means are gull-winged shaped.

9. The fastener of claim 1 including projecting means extending from said base for locating and positioning said fastener in a mold when forming the panel assembly and for aiding the retention of said fastener in the molded portion of the assembly.

10. The fastener of claim 9 wherein said projecting means are spaced toward said resilient means from said surface on said extending portions of said base.

11. The fastener of claim 1 wherein said fastener is molded in one piece from a polymeric material such as acetal resin.

12. The fastener of claim 1 wherein said resilient means include at least one resilient member extending outwardly from said base and having a surface spaced from said base which extends generally parallel to said base to resist removal of said fastener from the assembly.

13. The fastener of claim 12 wherein said base is planar.

14. The fastener of claim 12 wherein said resilient member is offset laterally from the centerline of said base toward one edge of said base.

15. The fastener of claim 12 wherein said resilient member is tubular, the axis of said tubular member extending generally parallel to said base.

16. The fastener of claim 15 wherein said tubular member is generally oval in cross section, the larger internal dimension of said oval tubular member extending generally parallel to said base.

17. The fastener of claim 16 wherein said oval tubular member includes opposing sidewalls and a bottom wall spaced from said base, said opposing sidewalls being thinner than said bottom wall.

18. The fastener of claim 16 wherein the end surfaces of said tubular member are sloped inwardly toward one another.

19. The fastener of claim 1 wherein said attachment means include at least one resilient securing member extending outwardly from said base, said resilient member adapted to engage an aperture in a mold assembly to retain said fastener in a desired position within the mold during formation of the molded panel assembly portion.

20. The fastener of claim 1 wherein said attachment means include a post for receiving a fastener thereon.

21. The fastener of claim 1 wherein said attachment means include means for hingedly securing said fastener and any panel assembly to which it is secured to a support.

22. The fastener of claim 1 wherein said attachment means include an aperture for receiving a fastening member therein.

23. A fastener for securing a panel assembly such as a vehicle window assembly or the like to a support, said fastener adapted for embedding in a molded portion of the panel assembly and comprising:
a base;
resilient means on said base for engaging a rigid member in the panel assembly to urge said base into sealing contact with a mold portion during formation of the molded portion of the panel assembly and for retaining said fastener in the molded portion of the panel assembly;
attachment means on said base for securing the fastener and the panel assembly to a support; and
projecting means extending from said base for locating and positioning said fastener in a mold when forming the panel assembly and for aiding the retention of said fastener in the molded portion of the assembly; said projecting means being spaced toward said resilient means from said surface of said base and including a plurality of pins extending from edges of said base; said base including a surface adapted to sealingly engage a mold portion during formation of the panel assembly.

24. The fastener of claim 10 wherein said projecting means include a plurality of elongated lugs extending from edges of said base.

25. A fastener for securing a panel assembly such as a vehicle window assembly or the like to a support, said fastener adapted for embedding in a molded portion of the panel assembly and comprising:
a base;
resilient means on said base for engaging a rigid member in the panel assembly to urge said base into sealing contact with a mold portion during formation of the molded portion of the panel assembly and for retaining said fastener in the molded portion of the panel assembly;
attachment means on said base for securing the fastener and the panel assembly to a support;
said resilient means including at least one resilient member extending outwardly from said base and having a surface spaced from said base which extends generally parallel to said base to resist removal of said fastener from the assembly; said resilient member being a cantilevered flange which curves outwardly away from said base to a free end and tapers in thickness from said base to said free end to promote flexing when urged against the rigid member in the panel assembly during molding thereof.

26. The fastener of claim 25 including a pair of said cantilevered flanges spaced apart on said base, said flanges curving away from one another.

27. The fastener of claim 25 including a pair of said cantilevered flanges spaced apart on said base, said flanges curving toward one another.

28. A fastener for securing a panel assembly such as a vehicle window assembly or the like to a support, said fastener adapted for embedding in a molded portion of the panel assembly and comprising:
a base;
resilient means on said base for engaging a rigid member in the panel assembly to urge said base into sealing contact with a mold portion during formation of the molded portion of the panel assembly and for retaining said fastener in the molded portion of the panel assembly;
attachment means on said base for securing the fastener and the panel assembly to a support;
said attachment means including at least one resilient securing member extending outwardly from said base, said resilient member adapted to engage an aperture in a mold assembly to retain said fastener in a desired position within the mold during formation of the molded panel assembly portion; said attachment means being an upstanding post on said base; said resilient securing member including an arm extending from said post at an angle to said base, said arm being flexible with respect to said post and having serrations thereon for engaging a support.

29. A fastener for securing a panel assembly such as a vehicle window assembly or the like to a support, said fastener adapted for embedding in a molded portion of the panel assembly and comprising:
a base;
resilient means on said base for engaging a rigid member in the panel assembly to urge said base into sealing contact with a mold portion during formation of the molded portion of the panel assembly and for retaining said fastener in the molded portion of the panel assembly;

attachment means on said base for securing the fastener and the panel assembly to a support;

said attachment means including at least one resilient securing member extending outwardly from said base, said resilient member adapted to engage an aperture in a mold assembly to retain said fastener in a desired position within the mold during formation of the molded panel assembly portion; said attachment means being an upstanding first flange on said base; said resilient securing member including a second flange extending from said first flange at an angle to said base, said second flange being flexible with respect to said first flange and having serrations thereon for engaging a support.

30. A panel assembly such as that providing a window for a vehicle adapted to be secured as a unit to a support such as a vehicle body, said assembly comprising:

a panel having a peripheral edge;

a casing of molded material molded around at least a portion of said peripheral edge of said panel;

a fastener mounted in said casing for securing said panel assembly to the support, said fastener including a base, resilient means on said base and embedded within said casing for engaging a rigid member in said casing to urge said base into sealing contact with a mold portion during molding of said casing and for retaining said fastener in said casing, and attachment means on said base and exposed to the exterior of said casing for securing said fastener and said assembly to the support.

31. The assembly of claim 30 wherein said base has first and second opposing side surfaces; said first side surface facing inwardly of said casing; said second side surface facing outwardly of said casing; said resilient means being on said first surface; said attachment means being on said second surface.

32. The assembly of claim 31 wherein said base extends around said attachment means; said second side surface of said base having portions exposed at a surface of said casing; said exposed portions of said second side surface adapted to sealingly engage a mold portion during molding of said casing to prevent the flow of molding material around said attachment means.

33. The assembly of claim 30 including retaining means on said base and separate from said resilient means for aiding retention of said fastener embedded in said casing.

34. The assembly of claim 33 including projecting means extending from said base for locating and positioning said fastener in a mold during molding of said casing and for aiding the retention of said fastener in said casing.

35. The assembly of claim 33 wherein said retaining means include a flange extending outwardly from said base, said flange having at least one portion extending parallel to but spaced from said base.

36. The assembly of claim 35 wherein said resilient means include a pair of flanges spaced apart on and extending outwardly from said base; said retaining means extending from said base at a position intermediate said flanges.

37. The assembly of claim 36 wherein said base includes opposite lateral edges; said retaining means being offset toward one of said lateral edges of said base from the centerline of said base and said pair of flanges being offset toward the other of said lateral edges of said base from said base centerline whereby flow of molding material along the length of said base past said flanges and retaining means during molding of said casing is promoted.

38. The assembly of claim 35 wherein said retaining means are T-shaped.

39. The assembly of claim 35 wherein said retaining means are gull-winged shaped.

40. The assembly of claim 30 including projecting means extending from said base for locating and positioning said fastener in a mold during molding of said casing and for aiding the retention of said fastener in said casing.

41. The assembly of claim 40 wherein said base includes a surface adapted to sealingly engage a mold portion during molding of said casing; said projecting means being spaced toward said resilient means from said surface of said base.

42. The assembly of claim 41 wherein said projecting means include a plurality of pins extending from edges of said base.

43. The assembly of claim 41 wherein said projecting means include a plurality of elongated lugs extending from edges of said base.

44. The assembly of claim 30 wherein said fastener is molded in one piece from a polymeric material such as acetal resin.

45. The assembly of claim 30 wherein said resilient means include at least one resilient member extending inwardly of said casing from said base and having a surface spaced from said base which extends generally parallel to said base to resist removal of said fastener from said casing.

46. The assembly of claim 45 wherein said resilient member is a cantilevered flange which curves outwardly away from said base, terminates at a free end, and tapers in thickness from said base to said free end to promote flexing when urged against the rigid member in the panel assembly during molding thereof.

47. The assembly of claim 46 including a pair of said cantilevered flanges spaced apart on said base, said flanges curving away from one another.

48. The assembly of claim 46 including a pair of said cantilevered flanges spaced apart on said base, said flanges curving toward one another.

49. The assembly of claim 45 wherein said resilient member is offset laterally from the centerline of said base toward one edge of said base.

50. The assembly of claim 45 wherein said resilient member is tubular, the axis of said tubular member extending generally parallel to said base.

51. The assembly of claim 56 wherein said tubular member is generally oval in cross section; the larger internal dimension of said oval tubular member extending generally parallel to said base.

52. The assembly of claim 51 wherein said oval tubular member includes opposing sidewalls and a bottom wall spaced from said base, said opposing sidewalls being thinner than said bottom wall.

53. The assembly of claim 51 wherein the end surfaces of said tubular member are sloped inwardly toward one another.

54. The assembly of claim 36 wherein said attachment means include at least one resilient securing member extending outwardly from said base, said resilient member adapted to engage an aperture in a mold assembly to retain said fastener in a desired position within the mold during molding of said casing.

55. The assembly of claim 54 wherein said attachment means include an upstanding post on said base; said resilient securing member including an arm extending from said post at an angle to said base, said arm being flexible with respect to said post and having serrations thereon for engaging a support.

56. The assembly of claim 54 wherein said attachment means include an upstanding first flange on said base; said resilient securing member including a second flange extending from said first flange at an angle to said base, said second flange being flexible with respect to said first flange and having serrations thereon for engaging a support.

57. The assembly of claim 30 wherein said attachment means include a post for receiving a fastener thereon.

58. The assembly of claim 30 wherein said attachment means include means for hingedly securing said fastener and panel assembly to a support.

59. The assembly of claim 30 wherein said attachment means include an aperture for receiving a fastening member therein.

* * * * *

UNITED STATES PATENT AND TRADEMARK OFFICE
CERTIFICATE OF CORRECTION

PATENT NO. : 4,700,525

DATED : October 20, 1987

INVENTOR(S) : Keith A. Nieboer and Herbert D. Tucker

It is certified that error appears in the above-identified patent and that said Letters Patent is hereby corrected as shown below:

Column 4, line 27:

After "the" insert --mold--

Column 16, claim 51, line 55:

"claim 56" should be --claim 50--

Column 16, claim 54, line 66:

"claim 36" should be --claim 30--.

Signed and Sealed this

Twenty-fifth Day of July, 1989

*Attest:*

DONALD J. QUIGG

*Attesting Officer*    *Commissioner of Patents and Trademarks*